United States Patent [19]

Michel

[11] 4,284,397
[45] Aug. 18, 1981

[54] DEVICE FOR DRAWING THERMOPLASTIC PREFORMS DURING THE BLOW MOLDING THEREOF

[75] Inventor: Edmond Michel, Brussels, Belgium

[73] Assignee: Solvay & Cie. (Société Anonyme), Brussels, Belgium

[21] Appl. No.: 68,955

[22] Filed: Aug. 23, 1979

[30] Foreign Application Priority Data

Aug. 24, 1978 [FR] France .................................. 78 24756

[51] Int. Cl.³ ...................... B29C 17/02; B29C 17/07
[52] U.S. Cl. .................................. 425/392; 264/532; 425/154; 425/529
[58] Field of Search ............... 425/154, 529, 392, 398, 425/403, 457, 469; 264/532

[56] References Cited

U.S. PATENT DOCUMENTS

| 1,899,238 | 2/1933 | Kirchhoff | 425/154 X |
| 2,001,026 | 5/1935 | Kirchhoff | 425/154 |
| 3,859,019 | 1/1975 | Wight | 425/154 X |

*Primary Examiner*—Jan H. Silbaugh
*Attorney, Agent, or Firm*—Spencer & Kaye

[57] ABSTRACT

Device for the longitudinal drawing of thermoplastic preforms possessing a closed base and an open neck during the blow moulding of these preforms comprising a rod introduced in the preforms through their open neck and arranged so as to exert a controlled axial thrust on the base of the preforms in which the drawing rod is provided with slots and is actuated by a driving sleeve in which it can slide and with which it is rendered integral by means of retractable wedges housed in the slots and held in place by means of calibrated springs.

6 Claims, 3 Drawing Figures

DEVICE FOR DRAWING THERMOPLASTIC PREFORMS DURING THE BLOW MOLDING THEREOF

BACKGROUND OF THE INVENTION

The present invention relates to a device for the longitudinal drawing of thermoplastic preforms possessing a closed base and an open neck, during the blow moulding of these preforms, for the purpose of producing hollow bodies.

At the present time, blow-moulding techniques are very widely used for the production of thermoplastic hollow bodies.

According to one of the most common techniques, preforms having a closed base and an open neck are produced in a first stage, and then, in a second stage, these preforms are blow-moulded in order to produce the desired hollow bodies. In general, the preforms are produced by injection moulding or blow moulding and have a diameter and a height which are considerably smaller than the diameter and the height of the hollow bodies to be produced. Furthermore, these preforms are advantageously subjected to axial drawing, before or during the final drawing which accompanies blow moulding. This kind of drawing proves particularly beneficial if the preforms have been subjected to prior thermal conditioning suitable for producing molecularly oriented hollow bodies during the final moulding. In fact, in this case, the longitudinal drawing of the preforms produces an axial molecular orientation in the latter, whereas the drawing caused by the final blowing produces a radial molecular orientation. Hollow bodies are thus obtained in which the walls are molecularly bioriented in orthogonal directions, and which are characterized by exceptional mechanical properties.

In general, the longitudinal drawing of the preforms is carried out by means of drawing rods which are introduced into the preforms through their open neck, and which exert a thrust on their closed base. The travel of the drawing rods is generally calculated so that the preforms, held by their neck, are drawn longitudinally until they reach a length which is virtually equal to, or slightly less than, the height of the desired hollow bodies. Since hydraulic or pneumatic drive systems are incapable of displacing the drawing rods with sufficient uniformity, the latter are generally actuated mechanically, for example by means of cams.

However, the use of mechanically actuated drawing rods exhibits a very serious disadvantage. In fact, it frequently happens that, during their necessary displacement, the drawing rods exert too great a thrust on the bases of the preforms and perforate them. An incident of this kind can occur, for example, if, for any reason, a preform is at a temperature which is less, even slightly less, than the temperature envisaged for drawing. In such a case, the preform is not blown when the expansion fluid is introduced and it usually remains attached to the mould or to the blow nozzle when the mould is opened. This consequently necessitates the continual presence of an operator for removing the perforated preforms by hand, in order to free the blow moulds.

SUMMARY OF THE INVENTION

The object of the present invention is to overcome this disadvantage of the known devices. The invention, as characterised in the claims, in fact aims to create a device for the longitudinal drawing of thermoplastic preforms possessing a closed base and an open neck, which device comprises a mechanically actuated rod for longitudinal drawing, which retracts when the thrust exerted on the base of the preforms exceeds a predetermined value, so as to prevent, with certainty, the perforation of the base of the preforms during the drawing thereof.

The device which forms the subject of the invention comprises a rod for longitudinal drawing, which is arranged so as to exert an axial thrust on the base of the preforms and is mechanically actuated, and which is provided with slots and is actuated by means of a driving sleeve in which it can slide and with which it is rendered integral by means of retractable wedges housed in the slots.

According to a preferred embodiment of the device according to the invention, the wedges can be displaced in a direction perpendicular to the axis of the drawing rod. The slots provided in the drawing rod, and the retractable wedges, are profiled so that part of the thrust exerted by the drawing rod, which thrust is transmitted by the retractable wedges, is exerted on the retractable wedges in a direction perpendicular to the axis of the drawing rod, and the retractable wedges are held in place by means of calibrated springs.

According to a preferred variant of this embodiment, the slots provided in the drawing rod possess a surface which is oblique relative to the axis of the drawing rod, on which surface retractable wedges bear, these wedges consisting of rollers which are held in place by means of push-rods and calibrated springs.

Furthermore, the device according to the invention is explained in greater detail, with the aid of drawings, in the following description of a preferred embodiment, which is given by way of illustration.

DESCRIPTION OF THE PREFERRED EMBODIMENTS

Figure 1:
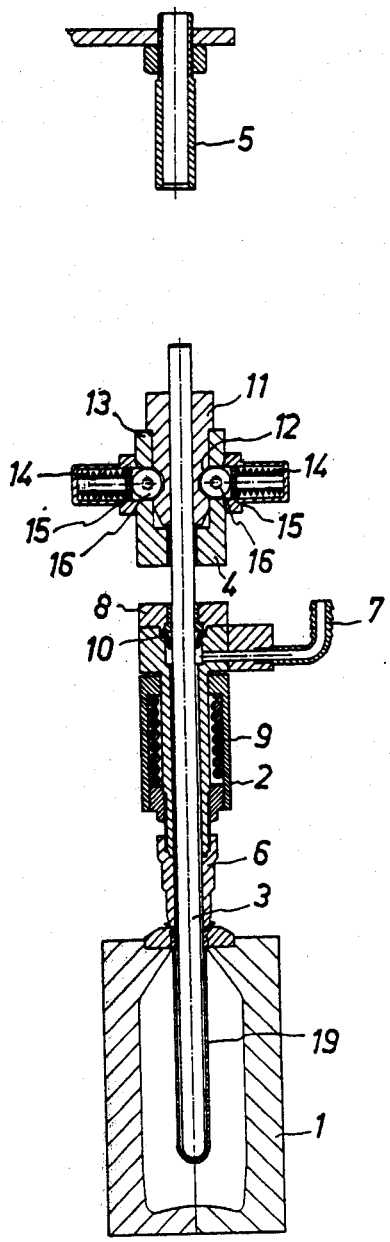
FIG. 1 is a view, in section and in elevation, of a moulding unit comprising a device according to the invention.

The moulding unit illustrated (FIG. 1) forms part of a blow-moulding apparatus comprising a series of parallel units mounted radially on a support which is not shown and is preferably a rotary support. Each moulding unit comprises a blow mould 1, a blowing device 2, a rod 3 for longitudinal drawing, a sleeve 4 for driving the drawing rod, and a stop 5.

The blow mould 1 is of the conventional type and generally consists of two complementary half-moulds.

The blowing device 2 is also of the conventional type, with the exception that the drawing rod 3, which is coaxial therewith, can slide freely through this blowing device. The blowing device comprises a blow nozzle 6, a pipe 7 for introducing the expansion fluid, a case 8 for distributing the expansion fluid, a spring device 9, which presses the blow nozzle 6 closely against the mouth of the blow mould 1 during the blow moulding of the preforms, and a sealing device 10, which prevents the losses of expansion fluid between the distributing case 8 and the drawing rod 3.

The blowing device is controlled by a profiled cam 17 (FIGS. 2 and 3), which brings this device into close contact with the mouth of the mould 1 when the latter is closed and contains a preform 19 to be blow-moulded, and which moves this device away from the mouth of the mould 1 after the blow-moulding operation.

The end of the drawing rod 3 which exerts the thrust on the base of the preforms is profiled so as to minimise any risk of damage to the base of the preforms; this end is therefore free of sharp angles. If the longitudinal drawing of the preforms is carried out before the final blowing, it can be advantageous to carry out a slight preblowing of the preforms during the drawing thereof, so as to avoid any sticking of the preforms to this rod. It can also be advantageous, during the final blowing, to introduce the expansion fluid at a distance from the base of the preforms of between 20 and 60% of their length subjected to expansion, this introduction being carried out in the direction of the base of the preforms.

The sleeve 4 (FIG. 1) for driving the drawing rod 3 grips the actual drawing rod 3 and also a control sleeve 11 fixed to the driving end of the drawing rod 3; it is this control sleeve which possesses slots 12, the profile of which has the shape of a flattened M. The control sleeve 11, which is completely integral with the drawing rod 3, can slide in the cylindrical part 13 of the driving sleeve 4. The latter is equipped with calibrated springs 14 and pushrods 15, which act on rollers 16 applied by these springs 14 against the hollow of the slots 12 in the control sleeve 11. The driving sleeve 4 is actuated by a profiled control cam 18 (FIGS. 2 and 3), which governs its movements.

The stop 5 consists of a hollow tube in which the driving end of the drawing rod 3 can be inserted, and against the end of which the control sleeve 11, fixed to this drawing rod 3, can come to rest. The stop 5, which can be adjusted, accompanies the moulding unit in its movements.

In a device of this type, when the control cam 18 causes a displacement of the driving sleeve 4, the latter drives the drawing rod 3 via the push-rods 15 with rollers 16, which rollers are applied, by means of the springs 14, against the hollow of the slots 12 in the control sleeve 11 fixed to the rod 3. If, for any reason, the thrust applied to the drawing rod exceeds a certain limiting value, determined both by the power of the calibrated springs 14 and by the angle of the slope of the oblique surface of the slots in the control sleeve 11, the push-rods 15, with rollers 16, are pushed back and the drawing rod 3 is no longer driven.

It is therefore apparent that, by judiciously choosing the angles of the oblique surface of the slots 12 in the control sleeve 11, and also the power of the calibrated springs 14 acting on the push-rods 15 with rollers 16, it is possible precisely to adjust the maximum thrust which can be transmitted to the drawing rod 3. Furthermore, adjusting screws or similar means can be provided for adjusting the pressure exerted by the calibrated springs on the push-rods 15 with rollers 16.

The cam 18 for controlling the driving sleeve 4 can be profiled in such a way that the longitudinal drawing of the preforms is carried out before or during the final blow moulding.

It is self-evident that, during the longitudinal drawing stage, the preform 19 must be held by its open neck. A very simple means for achieving this result consists in introducing the preform 19 into the final blow mould 1 before carrying out the longitudinal drawing thereof, and in holding it by its neck, during this drawing, by means of the mould 1 in conjuction, if appropriate, with the blow nozzle 6. A further means would consist in holding the preform by means of a mould with a suitable neck, during this drawing, it being possible for the drawing to be carried out inside or outside the final blow mould.

The cam 18 for controlling the driving sleeve 4 can also be designed so as to return this sleeve to its initial position after the drawing and final blowing operations, in such a way that the drawing rod 3 is returned to its starting position for a further cycle. The stop 5 can serve to block the driving end of the drawing rod 3 during the raising thereof. Furthermore, it correctly reintroduces the sleeve 11, for controlling the drawing rod 3, into the driving sleeve 4 in the case where the control sleeve has come out of the driving sleeve because the predetermined limiting value of the thrust exerted by the drawing rod 3 has accidentally been exceeded.

In the case of normal operation (FIG. 2), in position A (start of a drawing and blowing cycle), the blowing device 2 and the sleeve 4 for driving the drawing rod 3 are held away from the mould 1 by means of the profiled cams 17 and 18, which mould closes around a preform 19 to be moulded, the closing of the mould being complete when the moulding unit touches the inclined parts 20 and 21 of the profiling of the cams 17 and 18.

As from this moment, the blowing device 2 gradually approaches the closed mould 1, and the nozzle 6 is applied to the mouth of the mould 1 when the moulding unit reaches the end of the inclined parts 20 and 21 of the profiling of the cams 17 and 18. Simultaneously, by virtue of the cam 18, the profiling 21 of which is more pronounced than that of the cam 17, the driving sleeve 4 approaches the blowing device 2 and this causes the drawing rod 3 to slide through the blowing device 2, starting the longitudinal drawing of the preform 19 enclosed in the mould 1. The profiling of the section 21 of the cam 18 is designed in such a way that the desired longitudinal drawing of the preforms 19 is reached when the moulding unit reaches position B.

In position B, the blow nozzle 6 is applied against the mouth of the mould 1, and the preform 19 is longitudinally drawn to the desired length.

The drawn preform is then blow-moulded while the moulding unit advances from position B to position C, the blow nozzle being held against the mouth of the mould 1. It is of course possible to modify the profiling of the cams 17 and 18 so as to carry out the longitudinal drawing and the blowing of the preform 19 simultaneously.

When the moulding unit reaches position C, the blowing of the preform and the cooling of the hollow body moulded in this way are stopped.

At this moment, the moulding unit touches the inclined parts 22 and 23 of the cams 17 and 18. The profiling 23 causes the gradual retraction of the drawing rod 3, and the profiling 22 causes the retraction of the blowing device 2, relative to the mould 1. When the moulding unit reaches the end of the profilings 22 and 23 of the cams 17 and 18, the sleeve 11 for controlling the drawing rod comes to rest against the stop 5, and the blowing device 2 and also the sleeve 4 for driving the drawing rod 3 have resumed their initial position, as shown in position D.

Furthermore, during the passage of the moulding unit from position C to position D, the mould 1 is gradually opened and the moulded hollow body 24 is withdrawn from the mould.

In the case of abnormal operation (FIG. 3), that is to say when the thrust exerted by the drawing rod 3 on the base of the preform 19 exceeds the predetermined limiting value, the operating cycle is analogous to that which has just been described, with the exception of the following differences.

When the moulding unit passes from position A to position B, and at the moment when the thrust exerted by the rod 3, for longitudinal drawing, on the base of the preform 19 reaches the limiting value which is predetermined, the rollers 16 of the push-rods 15 are pushed back against the action of the springs 14, and the driving sleeve 4 no longer drives the rod 3, for longitudinal drawing, via the control sleeve 11. In other words, the driving sleeve 4 causes, via the control sleeve 11, the descent of the rod 3, for longitudinal drawing, into the preform 19 until the thrust exerted by this drawing rod 3 reaches the predetermined value, and, at this moment, the driving sleeve ceases to drive the drawing rod 3 because of a relative movement between the driving sleeve 13 and the control sleeve 11.

Figure 3:
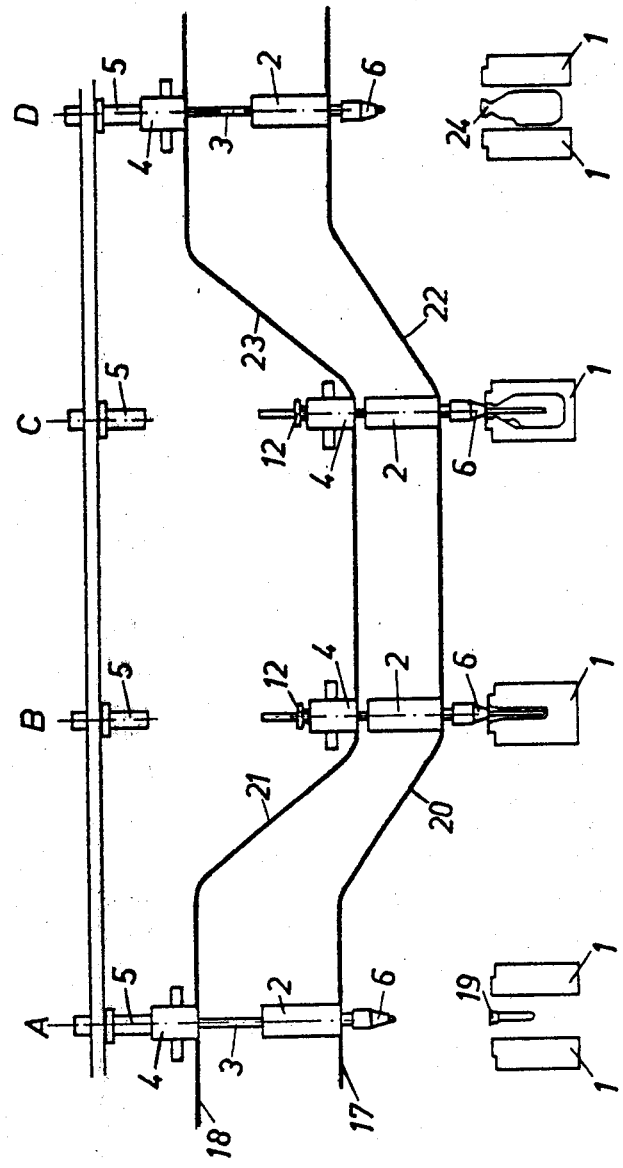
FIG. 3 is a schematic view showing a moulding cycle when the thrust exerted by the drawing rod exceeds a predetermined limiting value.

As is apparent from position B of FIG. 3, the control sleeve 11 in this case comes out of the cylindrical part 13 of the driving sleeve 4, and the preform is no longer axially drawn.

However, even in this case of abnormal operation during drawing, the blow moulding takes place normally and the preform is therefore blown to give a hollow body which is withdrawn normally from the mould.

Furthermore, during the passage of the moulding unit from position C to position D, the control sleeve 11 comes to rest against the stop 5 during the raising of the driving case 13 due to the effect of the profiling 23 of the cam 18. This stop holds the drawing rod 3 back and forces the control sleeve 11 into the driving sleeve 4, with the result that all the components of the device have resumed their initial position when the moulding unit is in position D, and a new moulding cycle can be undertaken.

Figure 2:
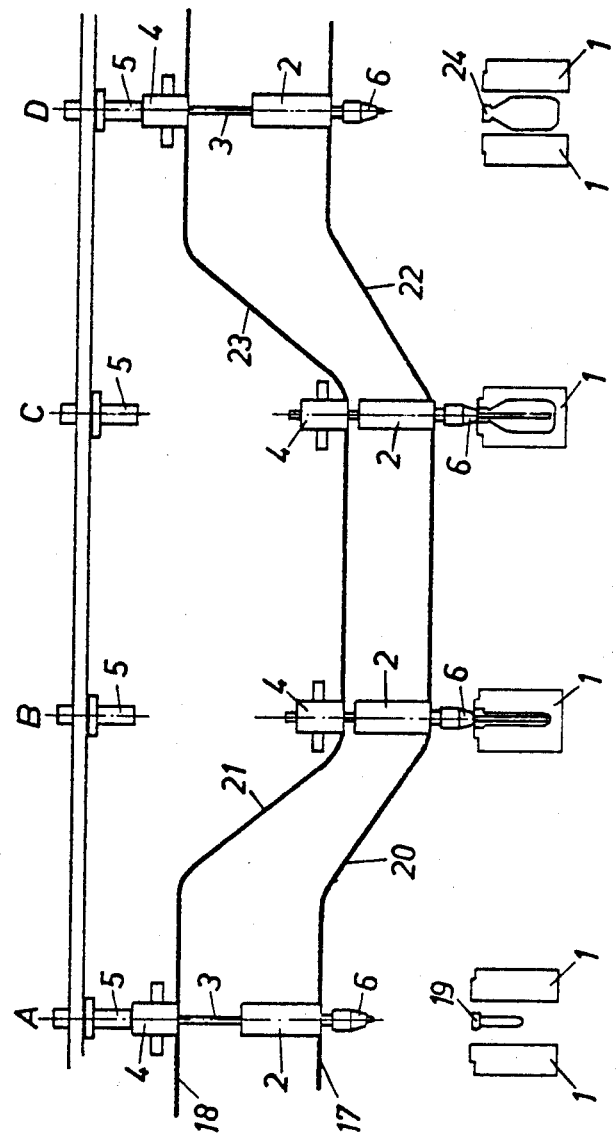
FIG. 2 is a schematic view showing a normal moulding cycle.

In FIGS. 2 and 3, the moulding units are shown, for the purpose of clarity, as if they moved in one plane, but it is quite obvious that, in the case of a rotary apparatus, the moulding units can follow a circular path.

Futhermore, it seems quite obvious that the maximum thrust which can be exerted by the rods 3, for longitudinal drawing, can be adjusted with high precision by modifying either the power of the calibrated springs 14 or the profiling of the slots 12 in the control sleeve 11.

The device according to the invention is particularly suitable for the production of molecularly bioriented hollow bodies; it suffices to employ preforms thermally conditioned at a temperature which induces, during drawing, molecular orientation stresses in the material of which they are made. The preforms used in this case can advantageously be provided with a hemispherical closed base, as described in Belgian Pat. No. 826,676, filed on Mar. 14th, 1975 by Solvay & Cie. In this case, the end of the drawing rod which comes into contact with the base of the preforms advantageously has a hemispherical shape.

What is claimed is:

1. Device for the longitudinal drawing of thermoplastic preforms each possessing a closed base and an open neck comprising: means for holding a preform by its open neck; a rod provided with slots and mounted to be actuated mechanically for longitudinal drawing positioned with respect to said holding means so that when said rod is driven, said rod extends through the open neck and exerts an axial thrust on the base of the preform; a driving sleeve which actuates said rod and in which said rod can slide; mechanical means connected to said driving sleeve for driving said driving sleeve; retractable wedges which are housed in said slots and which normally secure said sleeve relative to said rod; and means which permit said wedges to retract from said slots when the axial thrust exceeds a predetemined value, so that said rod is not driven.

2. Device according to claim 1, wherein said wedges can be displaced in a direction perpendicular to the axis of said drawing rod.

3. Device according to claim 1 or 2, wherein said slots possess a surface which is oblique relative to the axis of said drawing rod.

4. Device according to claim 1 or 2, wherein said means which permit said wedges to retract comprise calibrated springs which hold said wedges in place.

5. Device according to claim 1 or 2, wherein said wedges consist of rollers.

6. Device according to claim 1 or 2, wherein said means which permit said wedges to retract comprise calibrated springs which hold said wedges in place, and each said slot possesses a surface which is oblique relative to the axis of said rod, such that said predetermined value is determined by the force exerted by said calibrated springs and the angle of slope of said oblique surface of each said slot.

* * * * *